US012583386B2

(12) United States Patent
Zhang

(10) Patent No.: US 12,583,386 B2
(45) Date of Patent: Mar. 24, 2026

(54) METHOD FOR DETECTING TARGET PEDESTRIAN AROUND VEHICLE, METHOD FOR MOVING VEHICLE, AND DEVICE

(71) Applicant: HUIZHOU DESAY SV AUTOMOTIVE CO., LTD., Guangdong (CN)

(72) Inventor: Peng Zhang, Guangdong (CN)

(73) Assignee: HUIZHOU DESAY SV AUTOMOTIVE CO., LTD., Guangdong (CN)

( * ) Notice: Subject to any disclaimer, the term of this patent is extended or adjusted under 35 U.S.C. 154(b) by 134 days.

(21) Appl. No.: 18/574,336

(22) PCT Filed: Dec. 3, 2021

(86) PCT No.: PCT/CN2021/135455
§ 371 (c)(1),
(2) Date: Dec. 27, 2023

(87) PCT Pub. No.: WO2023/070833
PCT Pub. Date: May 4, 2023

(65) Prior Publication Data
US 2024/0336196 A1 Oct. 10, 2024

(30) Foreign Application Priority Data

Oct. 26, 2021 (CN) .......................... 202111250830.6

(51) Int. Cl.
G06V 20/58 (2022.01)
B60R 1/12 (2006.01)
G06V 10/74 (2022.01)

(52) U.S. Cl.
CPC .............. B60R 1/12 (2013.01); G06V 10/761 (2022.01); G06V 20/58 (2022.01); B60R 2001/1253 (2013.01); B60R 2001/1284 (2013.01)

(58) Field of Classification Search
CPC ...................................................... G06V 20/58
See application file for complete search history.

(56) References Cited

U.S. PATENT DOCUMENTS 8,918,282 B1 * 12/2014 Stenneth .......... G08G 1/096775
701/411
2014/0161308 A1 * 6/2014 Krishnamoorthy .... G06V 10/50
382/103

(Continued)

*Primary Examiner* — Frank Johnson
(74) *Attorney, Agent, or Firm* — Birchwood IP

(57) ABSTRACT
A method for detecting a target pedestrian around a vehicle, a method for moving a vehicle, and a device are applied to an automobile electronic product. The method includes the following steps: monitoring a monitor area of a current vehicle in real time and acquiring a target trajectory; judging whether there is the target pedestrian in the monitor area according to the target trajectory, where if a judged result is true, there being the target pedestrian in the monitor area; and otherwise, performing no processing. According to the present application, the method for detecting a target pedestrian around a vehicle includes the following steps: judging whether there is a target vehicle owner around the vehicle; informing the vehicle owner; and then selecting, by the vehicle owner, whether a vehicle communication module is connected for communication. A first level communication initiative is mastered on an electronic rearview mirror, so that the problem that the vehicle owner is harassed is avoided.

8 Claims, 5 Drawing Sheets

(56)　　　　　References Cited

U.S. PATENT DOCUMENTS

| | | | |
|---|---|---|---|
| 2015/0332114 A1* | 11/2015 | Springer | H04N 7/183 |
| | | | 348/148 |
| 2018/0066957 A1* | 3/2018 | Stroila | G01C 21/3841 |
| 2019/0180120 A1* | 6/2019 | Gupta | G06T 7/246 |
| 2020/0023842 A1* | 1/2020 | Gutierrez | G06V 10/82 |
| 2020/0218910 A1* | 7/2020 | Herman | B60R 1/27 |
| 2020/0272148 A1* | 8/2020 | Karasev | G01S 17/58 |
| 2021/0271866 A1* | 9/2021 | Hayakawa | G06V 40/103 |
| 2021/0399942 A1* | 12/2021 | Yasunori | B60R 16/0232 |
| 2022/0242453 A1* | 8/2022 | Hahn | G06N 3/09 |
| 2024/0061821 A1* | 2/2024 | Li | G06F 16/29 |

* cited by examiner

METHOD FOR DETECTING TARGET PEDESTRIAN AROUND VEHICLE, METHOD FOR MOVING VEHICLE, AND DEVICE

TECHNICAL FIELD

The present invention relates to the technical field of automotive electronics, and more particularly relates to a method for detecting a target pedestrian around a vehicle, a method for moving a vehicle, and a device.

BACKGROUND

With rapid development of automobile technology, increasing people prefer to use a vehicle instead of walk when going out for some business. In downtown, a driver needs to park temporarily at the roadside in some special cases such as payments in the bank and purchase of petty commodities. In the parking process, illegal parking or blocking other vehicles will inevitably happen. In a patent Rearview mirror with call function with the Publication No. CN203496774U, rearview mirror integrated with a call function is designed. A communication button, an external loudspeaker and a microphone are arranged on a rearview mirror shell. An electric connecting wire is exported from the rearview mirror to connect the rearview mirror to a mobile communication module. A vehicle owner blocked stands out of the vehicle and presses the communication button to talk with the vehicle owner through the mobile communication module. As the communication button is exposed out of the vehicle and can be pressed by anyone, it is easy to harass the vehicle owner. The mobile communication module is additionally mounted, so that the cost of the vehicle is increased.

SUMMARY

To overcome the problems in the prior art, the present application provides a method for detecting a target pedestrian around a vehicle, a method for moving a vehicle, and a device.

A method for detecting a target pedestrian around a vehicle, applied to an automobile electronic product, where the method includes the following steps:

monitoring a monitor area of a current vehicle in real time and acquiring a target trajectory;

judging whether there is the target pedestrian in the monitor area according to the target trajectory;

if a judged result is true, there being the target pedestrian in the monitor area; and otherwise, performing no processing.

Optionally, the step of monitoring a monitor area of a current vehicle in real time and acquiring a target trajectory includes:

monitoring the monitor area through a left camera/right camera arranged on the current vehicle to acquire image information of the monitor area in real time, and identifying an image signal to judge whether the image signal comprises characteristics of the target pedestrian;

if the image signal comprises the characteristics of the target pedestrian, acquiring the target trajectory according to continuous image signals; and otherwise, performing no processing.

Optionally, the step of judging whether there is the target pedestrian in the monitor area according to the target trajectory includes:

calculating a similarity between the target trajectory and a preset trajectory and acquiring a similarity value; and if the similarity value is less than a preset similarity value, judging that there is the target pedestrian in the monitor area of the current vehicle, and otherwise, performing no processing.

Optionally, the similarity between the target trajectory and the preset trajectory is calculated by means of a Fréchet distance algorithm or a Hausdorff distance algorithm.

Optionally, the target trajectory includes a left trajectory collected by the left camera, and the preset trajectory comprises a first preset trajectory; and the step of calculating a similarity between the target trajectory and a preset trajectory and acquiring a similarity value includes:

the left trajectory being AB, a continuous function of the left trajectory at a variable t being y(t), and representing a spatial position of the left trajectory as f(y(t));

the first preset trajectory being A'B', a continuous function of the first preset trajectory at a variable t being y'(t), and representing a spatial position of the first preset trajectory as f(y'(t)); and calculating a similarity between the left trajectory and the first preset trajectory by means of the Fréchet distance algorithm to acquire a first similarity value, with a formula as follows:

$$F(AB, A'B') = \min_{\substack{y[0,t_{max}]\to[0,M] \\ y'[0,t_{max}]\to[0,M']}} \left\{ \max_{t\in[0,t_{max}]} d(f(y(t)), f'(y'(t))) \right\}, \quad (1)$$

where M is a length of the left trajectory, M' is a length of the first preset trajectory, and d((f(y(t)), f'(y'(t))) is a distance between f(y(t)) and f'(y'(t)).

Optionally, the target trajectory includes a right trajectory collected by the right camera, and the preset trajectory includes a second preset trajectory; and the step of calculating a similarity between the target trajectory and a preset trajectory and acquiring a similarity value includes:

the right trajectory being CD, a continuous function of the right trajectory at a variable t being g(t), and representing a spatial position of the right trajectory as f(g(t));

the second preset trajectory being A'B'=N, a continuous function of the second preset trajectory at a variable t being g'(t), and representing a spatial position of the second preset trajectory as f(g'(t)); and calculating a similarity between the right trajectory and the second preset trajectory by means of the Fréchet distance algorithm to acquire a second similarity value, with a formula as follows:

$$F(CD, C'D') = \min_{\substack{g[0,t_{max}]\to[0,N] \\ g'[0,t_{max}]\to[0,N']}} \left\{ \max_{t\in[0,t_{max}]} d(f(g(t)), f'(g'(t))) \right\}, \quad (2)$$

where N is a length of the right trajectory, N' is a length of the second preset trajectory, and d((f(g(t)), f'(g'(t))) is a distance between f(g(t)) and f'(g'(t)).

Optionally, the step of judging whether there is the target pedestrian in the monitor area according to the target trajectory further includes:

calculating an average velocity V of the left trajectory AB and the right trajectory CD, in $$V = \frac{V_{ab} + V_{cd}}{2}, \quad (3)$$

where $V_{ab}$ is average data of the left trajectory and $V_{cd}$ is an average velocity of the right trajectory; and letting a length from an end point B of the left trajectory to an end point D of the right trajectory to be L, and judging whether $$\frac{L}{V} \in [|T_b - T_d| - \Delta t, |T_b - T_d| + \Delta t] \tag{4}$$

is established, where $T_b$ is time when the pedestrian arrives at B, $T_d$ is time when the pedestrian arrives at D, and $\Delta t$ is preset time.

Optionally, the step of judging whether there is the target pedestrian in the monitor area according to the target trajectory includes:

when the first similarity value is less than a first preset similarity value of the preset similarity value, the second similarity value is less than a second preset similarity value of the preset similarity value, or the similarity values are less than any one or more of similarity values in formula (4), judging that there is the target pedestrian in the monitor area.

In addition, the present application further discloses a method for moving a vehicle, wherein the method includes the following steps:

judging whether there is a target pedestrian in a monitor area by means of the method for detecting a target pedestrian around a vehicle; and if there is the target pedestrian, sending a notification to a target terminal, and sending view images of a left camera and a right camera to the target terminal, and confirming, by the target terminal, whether a communication module of a current vehicle is connected for communication.

In addition, the present application further discloses a device, where the device is electronic rearview mirrors mounted on both sides of a vehicle or communication cameras mounted on left and right rearview mirrors; the device is provided with a master control module, a communication module, a camera, a loudspeaker and a microphone connected to one another; and the method for moving a vehicle is run on the master control module.

Compared with the prior art, the present application has the following beneficial effects: according to the present application, the method for detecting a target pedestrian around a vehicle includes the following steps: judging whether there is a target vehicle owner around the vehicle; informing the vehicle owner; and then selecting, by the vehicle owner, whether a vehicle communication module is connected for communication. A first level communication initiative is mastered on an electronic rearview mirror, so that the problem that the vehicle owner is harassed is avoided. In addition, the vehicle owner can further judge whether other vehicles are blocked according to the image transferred back by the electronic rearview mirror, and the second level communication initiative is mastered by the vehicle owner. The double guarantees enhance the favorability of clients on the product.

DETAILED DESCRIPTION OF EMBODIMENTS

Figure 1:
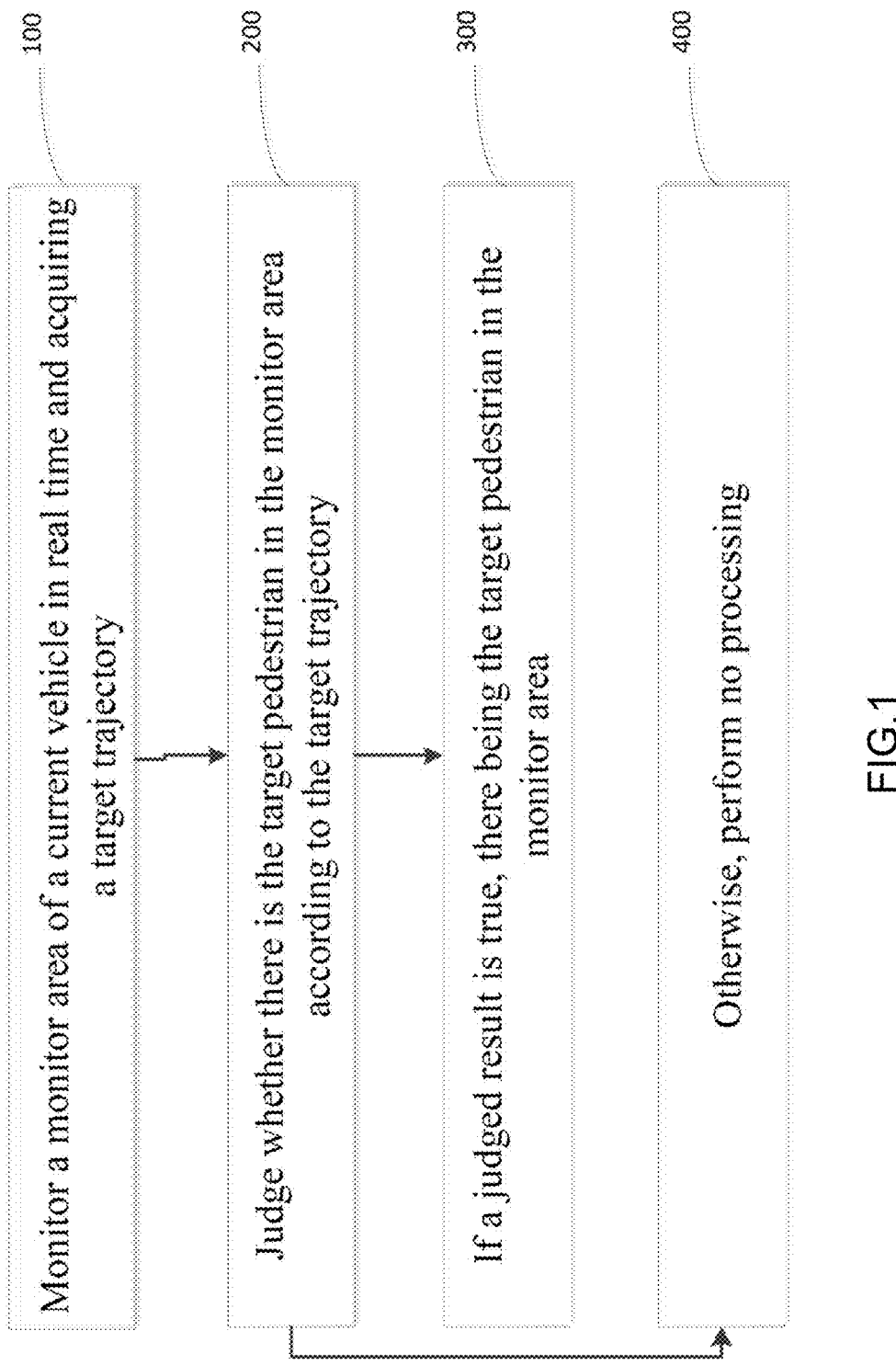
FIG. 1 is a flow chart of an embodiment of the present application.

The present application will be further described below in combination with specific implementation modes.

Same or similar numerals in the drawings of the embodiment of the present application correspond to same or similar parts. In description of the application, it should be understood that orientation or position relationships indicated by terms: 'upper', 'lower', 'left', 'right', 'top', 'bottom', 'inner', 'outer' and the like are orientation or position relationships indicated by the drawings and are only to describe the disclosure and simplify the description rather than indicates or implies that the indicated device or components must have specific orientations and are configured and operated in the specific orientations. Therefore, the terms for describing the position relationships in the drawings are merely used for exemplary specification and cannot be construed as limitations to the present application.

In addition, if there are terms such as 'first' and 'second' merely for a descriptive purpose, they are mainly used for distinguishing different devices, components and compositions (specific types and configurations may be same or different), rather than indicating or implying relative importance and quantities of the indicated devices, components or compositions, which cannot be understood as indicating or implying the relative importance.

In an embodiment shown in FIGS. 1-5, the present invention provides a method for detecting a target pedestrian around a vehicle, applied to an automobile electronic product, where the method includes the following steps:

100, monitoring a monitor area of a current vehicle in real time and acquiring a target trajectory; in S100, the step of monitoring the monitor area of the current vehicle in real time, and acquiring the target trajectory includes: monitoring the monitored area through a left camera/right camera arranged on the current vehicle to acquire image information of the monitor area in real time, and identifying an image signal to judge whether the image signal includes characteristics of the target pedestrian; if the image signal includes the characteristics of the target pedestrian, acquiring the target trajectory according to continuous image signals; and otherwise, performing no processing;

200, judging whether there is the target pedestrian in the monitor area according to the target trajectory; in S200, the step of monitoring a monitor area of a current vehicle in real time and acquiring a target trajectory includes: calculating a similarity between the target trajectory and a preset trajectory and acquiring a similarity value; and if the similarity value is less than a preset similarity value, judging that there is the target pedestrian in the monitor area of the current vehicle, and otherwise, performing no processing; or judging that there is the target pedestrian in the monitor area of the current vehicle in combination with an equation (4);

300, if a judged result is true, there being the target pedestrian in the monitor area; and

400, otherwise, performing no processing.

In the embodiment, according to the present application, the method for detecting a target pedestrian around a vehicle includes the following steps: judging whether there is a target vehicle owner around the vehicle; informing the vehicle owner; and then selecting, by the vehicle owner, whether a vehicle communication module is connected for communication. A first level communication initiative is mastered on an electronic rearview mirror, so that the problem that the vehicle owner is harassed is avoided. In addition, the vehicle owner can further judge whether other vehicles are blocked according to the image transferred back by the electronic rearview mirror, and the second level communication initiative is mastered by the vehicle owner. The double guarantees enhance the favorability of clients on the product.

In some embodiments, in S100, the step of monitoring the monitor area of the current vehicle in real time, and acquiring the target trajectory includes: monitoring the monitored area through a left camera/right camera arranged on the current vehicle to acquire image information of the monitor area in real time, and identifying an image signal to judge whether the image signal includes characteristics of the target pedestrian; if the image signal includes the characteristics of the target pedestrian, acquiring the target trajectory according to continuous image signals; and otherwise, performing no processing. In the embodiment, in the present application, the pedestrians around are identified through the left camera or right camera. The identifying method can be any figure identifying method. Whether the figure may be the vehicle owner blocked is initially judged according to age or other characteristics. If the figure may be the vehicle owner blocked after preliminary screening, the trajectory of the figure is tracked.

In some embodiments, in S200, the step of judging whether there is the target pedestrian in the monitor area according to the target trajectory includes:
  calculating a similarity between the target trajectory and a preset trajectory and acquiring a similarity value; and
  if the similarity value is less than a preset similarity value, judging that there is the target pedestrian in the monitor area of the current vehicle, and otherwise, performing no processing.

The similarity between the target trajectory and the preset trajectory is calculated by means of a Fréchet distance algorithm or a Hausdorff distance algorithm.

In an implementation mode of the above embodiment, the target trajectory includes a left trajectory collected by the left camera, and the preset trajectory includes a first preset trajectory; and the step of calculating a similarity between the target trajectory and a preset trajectory and acquiring a similarity value includes:
  the left trajectory being AB, a continuous function of the left trajectory at a variable t being y(t), and representing a spatial position of the left trajectory as f(y(t));
  the first preset trajectory being A'B', a continuous function of the first preset trajectory at a variable t being y'(t), and representing a spatial position of the first preset trajectory as f(y'(t)); and
  calculating a similarity between the left trajectory and the first preset trajectory by means of the Fréchet distance algorithm to acquire a first similarity value, with a formula as follows:

$$F(AB, A'B') = \min_{\substack{y[0,t_{max}] \to [0,M] \\ y'[0,t_{max}] \to [0,M']}} \left\{ \max_{t \in [0,t_{max}]} d(f(y(t)), f'(y'(t))) \right\}, \quad (1)$$

where M is a length of the left trajectory, M' is a length of the first preset trajectory, and d((f(y(t)), f'(y'(t))) is a distance between f(y(t)) and f'(y'(t)).

The target trajectory includes a right trajectory collected by the right camera, and the preset trajectory includes a second preset trajectory; and the step of calculating a similarity between the target trajectory and a preset trajectory and acquiring a similarity value includes:
  the right trajectory being CD, a continuous function of the right trajectory at a variable t being g(t), and representing a spatial position of the right trajectory as f(g(t));
  the second preset trajectory being A'B'=N, a continuous function of the second preset trajectory at a variable t being g'(t), and representing a spatial position of the second preset trajectory as f(g'(t)); and
  calculating a similarity between the right trajectory and the second preset trajectory by means of the Fréchet distance algorithm to acquire a second similarity value, with a formula as follows:

$$F(CD, C'D') = \min_{\substack{g[0,t_{max}] \to [0,N] \\ g'[0,t_{max}] \to [0,N']}} \left\{ \max_{t \in [0,t_{max}]} d(f(g(t)), f'(g'(t))) \right\}, \quad (2)$$

where N is a length of the right trajectory, N' is a length of the second preset trajectory, and d((f(g(t)), f'(g'(t))) is a distance between f(g(t)) and f'(g'(t)).

Figure 5:
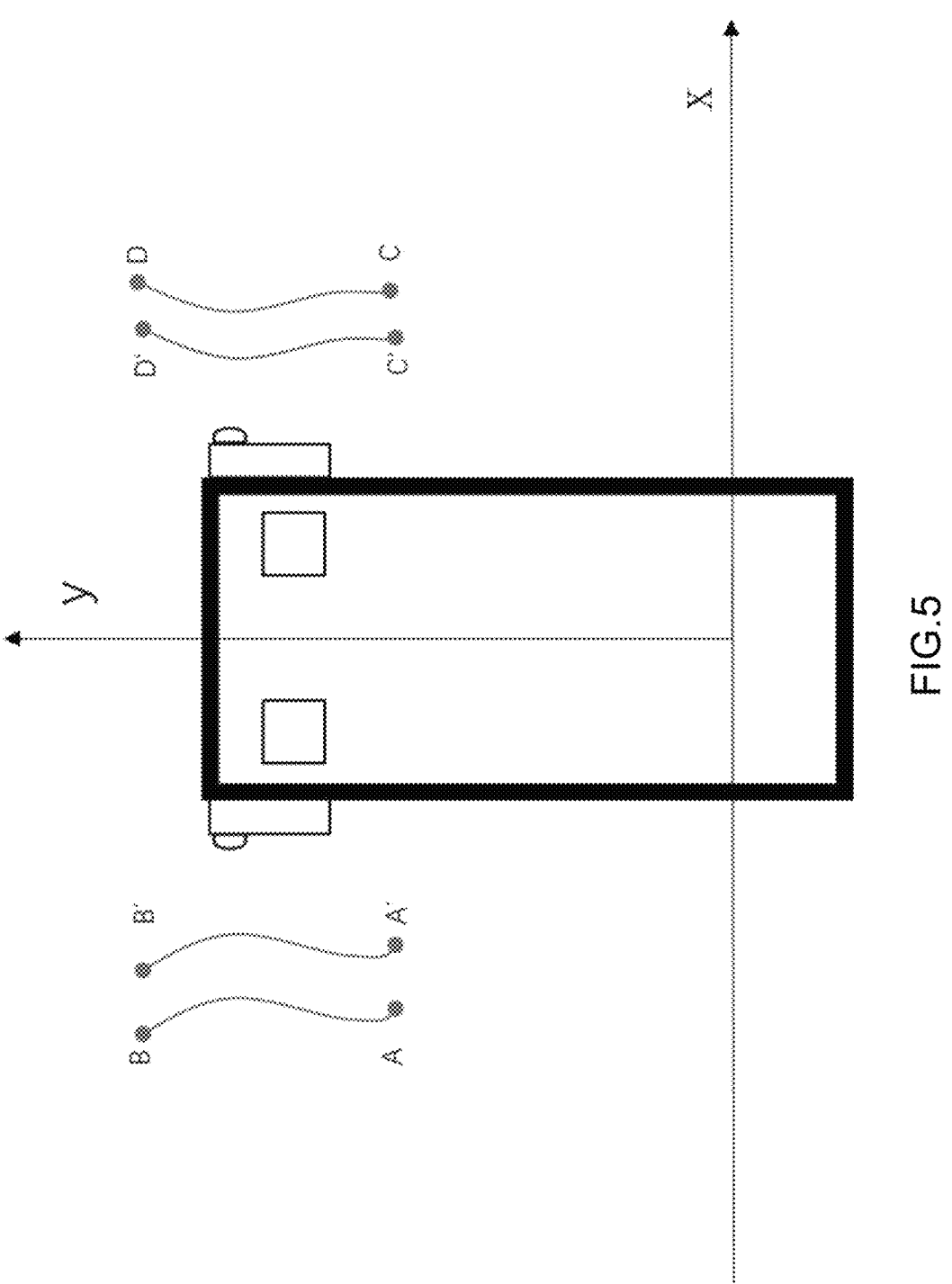
FIG. 5 is a schematic diagram of a target trajectory and a preset trajectory in the embodiment of the present application.

In the embodiment, as shown in FIG. 5, the trajectory of the tracked figure appears in the fields of view of the left camera and the right camera. The left and right trajectories are respectively AB and CD, the corresponding velocities are respectively Vab and Vcd, and time at the points A, B, C and D is respectively Ta, Tb, Tc and Td.

The trajectories A'B' and C'D' are a first preset trajectory and a second preset trajectory, and the first preset trajectory and the second preset trajectory are trajectories calibrated according to either different vehicle models or empirical trajectories. The corresponding velocities are respectively Va'b' and Vc'd', and the time at the points A', B', C' and D' is respectively Ta', Tb', Tc' and Td'.

In the embodiment, by taking the left trajectory of the vehicle as an example, lengths of the left trajectories AB and A'B' are respectively M and N. Moving positions of the figures on the two trajectories can be described with the continuous function of the same variable t, and y(t) and y'(t) respectively represent a tracking trajectory of the figure on the electronic rearview mirror and a moving position description function on the preset trajectory, where t∈(0, t_{max}), for the tracking trajectory, y(0)=0, y(t_{max})=M, and for the first preset trajectory, y'(0)=0, y'(t_{max})=M'.

By taking a center of a rear axis of the current vehicle as an origin of coordinates, with X axis as a horizontal direction and Y axis as a longitude direction, it is shown in FIG. 5. In the coordinate system, f(x) and f'(x) respectively represent the tracking trajectory and the preset trajectory.

At the time of the variable t, f(y(t)) represents a spatial position of the figure on the tracking trajectory based on the coordinate system in FIG. 5, f'(y'(t)) represents a spatial position of the figure on the preset trajectory based on the coordinate system in FIG. 5, and d((f(y(t)), f'(y'(t))) represents a distance between f(y(t)) and f'(y'(t)) based on the coordinate system in FIG. 5.

A curve similarity between the tracking trajectory AB and the preset trajectory A'B' is characterized with a Fréchet distance:

$$F(AB, A'B') = \min_{\substack{y[0,t_{max}]\to[0,M] \\ y'[0,t_{max}]\to[0,M']}} \left\{ \max_{t\in[0,t_{max}]} d(f(y(t)), f'(y'(t))) \right\}$$

when $F(AB, A'B') < K$, it is considered that AB and A'B' are similar, and otherwise, they are not similar. The first preset similarity value K here can be either the length calibrated according to different vehicle modes or the empirical length.

Similarly, whether the right trajectory of the current vehicle is similar is judged is the same to the above process. When $F(CD, C'D') < K'$, the electronic rearview mirror judges whether CD and C'D' are similar.

In some embodiments, the step of judging whether there is the target pedestrian in the monitor area according to the target trajectory further includes: calculating an average velocity V of the left trajectory AB and the right trajectory CD, where $$V = \frac{V_{ab} + V_{cd}}{2}, \tag{3}$$

where $V_{ab}$ is average data of the left trajectory and $V_{cd}$ is an average velocity of the right trajectory; and letting a length from an end point B of the left trajectory to an end point D of the right trajectory to be L, and judging whether $$\frac{L}{V} \in [|T_b - T_d| - \Delta t, |T_b - T_d| + \Delta t] \tag{4}$$

is established, where $T_b$ is time when the pedestrian arrives at B, $T_d$ is time when the pedestrian arrives at D, and $\Delta t$ is preset time. In the embodiment, the present application performs further judgment by the following way: V represents an average velocity of the tracked figure on the left trajectory AB and the right trajectory CD, i.e., $$V = \frac{V_{ab} + V_{cd}}{2};$$

and L represents a length from the point B to the point D in the coordinate system in FIG. 5. If $$\frac{L}{V} \in [|T_b - T_d| - \Delta t, |T_b - T_d| + \Delta t],$$

it represents that the trajectories AB and CD of the tracked figure are connected, i.e., the tracked figure passes the points A, B, C and D or C, D, B and A continuously. The $\Delta t$ here can be either the time length calibrated according to different vehicle modes or the empirical time length.

In some embodiment, the step of judging whether there is the target pedestrian in the monitor area according to the target trajectory includes: when the first similarity value is less than a first preset similarity value of the preset similarity value, the second similarity value is less than a second preset similarity value of the preset similarity value, or the similarity values are less than any one or more of similarity values in formula (4), judging that there is the target pedestrian in the monitor area. In the embodiment, when the following three conditions are satisfied: (1) $F(AB, A'B') < K$; (2) $F(CD, C'D') < K'$; and (3)

$$\frac{L}{V} \in [|T_b - T_d| - \Delta t, |T_b - T_d| + \Delta t],$$

the electronic rearview mirror judges that the tracking trajectories AB and CD are connected, and the tracking trajectories ABCD and A'B' C'D' are similar.

In some embodiments, the present application further discloses a method for moving a vehicle. The method includes: judging whether there is a pedestrian in a monitor area by means of the method for detecting a target pedestrian around a vehicle; if there is the target pedestrian, sending a notification to a target terminal, and sending view images of a left camera and a right camera to the target terminal, and confirming, by the target terminal, whether a communication module of a current vehicle is connected for communication. In the embodiment, whether there is a target vehicle owner around the vehicle is judged by the method for detecting a target pedestrian around a vehicle of this present application; whether the electronic rearview mirror is connected is informed to the vehicle owner by means of the method for detecting a target pedestrian around a vehicle, and the view image of the electronic rearview mirror is sent. If the vehicle owner is connected to the electronic rearview mirror, the vehicle owner can communicate with the target pedestrian through the loudspeaker and microphone to determine whether the move is needed to be moved.

In some embodiments, the present application further discloses a device, where the device is electronic rearview mirrors mounted on both sides of a vehicle or communication cameras mounted on left and right rearview mirrors; the device is provided with a master control module, a communication module, a camera, a loudspeaker and a microphone connected to one another; and the method for moving a vehicle is run on the master control module. In the embodiment, the device can be the electronic rearview mirror including a left electronic rearview mirror and a right electronic rearview mirror. The right electronic rearview mirror 110 and the left electronic rearview mirror 140 are respectively arranged on left and right sides of the vehicle 100 to replace conventional rearview mirrors. A right camera 111 is arranged on the right electronic rearview mirror 110, and a field of view of the right camera 111 is shown in a field of view of a right camera 112. A left camera 141 is arranged on the left electronic rearview mirror 140, and a field of view of the left camera 141 is shown in a field of view of a left camera 142. The fields of view of the left and right cameras are only schematic, and the actual fields of view are based on a real vehicle condition. A left display screen 130 and a right display screen 120 are arranged in the vehicle, the left display screen 130 and the left display screen 140 are connected through an electric line, and the right display screen 120 and the right electronic rearview mirror 110 are connected through an electric line.

The electronic rearview mirror 140 acquires an image in the field of view of the left camera 142 through the left camera 141 and transfers the image to the left display screen 130 through the electric line, and the image in the field of view of the left camera 142 is displayed on the left display screen 130, so that an effect the same with that of the conventional rearview mirrors is achieved. The theory of the right side is the same as that of the left side, which is not repeatedly described here.

Figure 2:
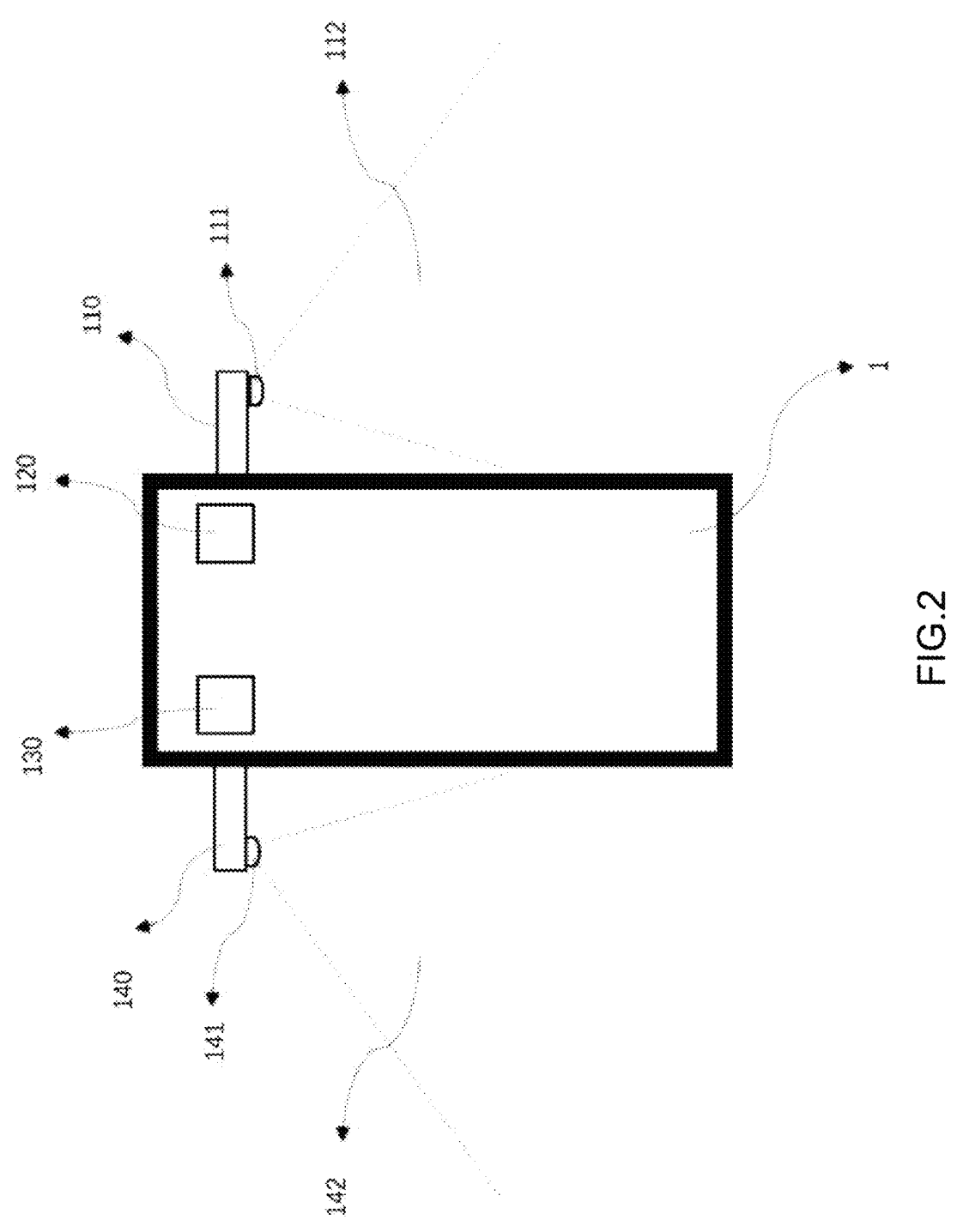
FIG. 2 is a view state diagram of a device of the embodiment of the present application.

FIG. 2 exhibits a function of the conventional rearview mirrors in the solution of the patent. When the vehicle is parked and the vehicle owner is away from the vehicle, the solution of the patent implements its monitoring function, as shown in FIG. 3.

Figure 3:
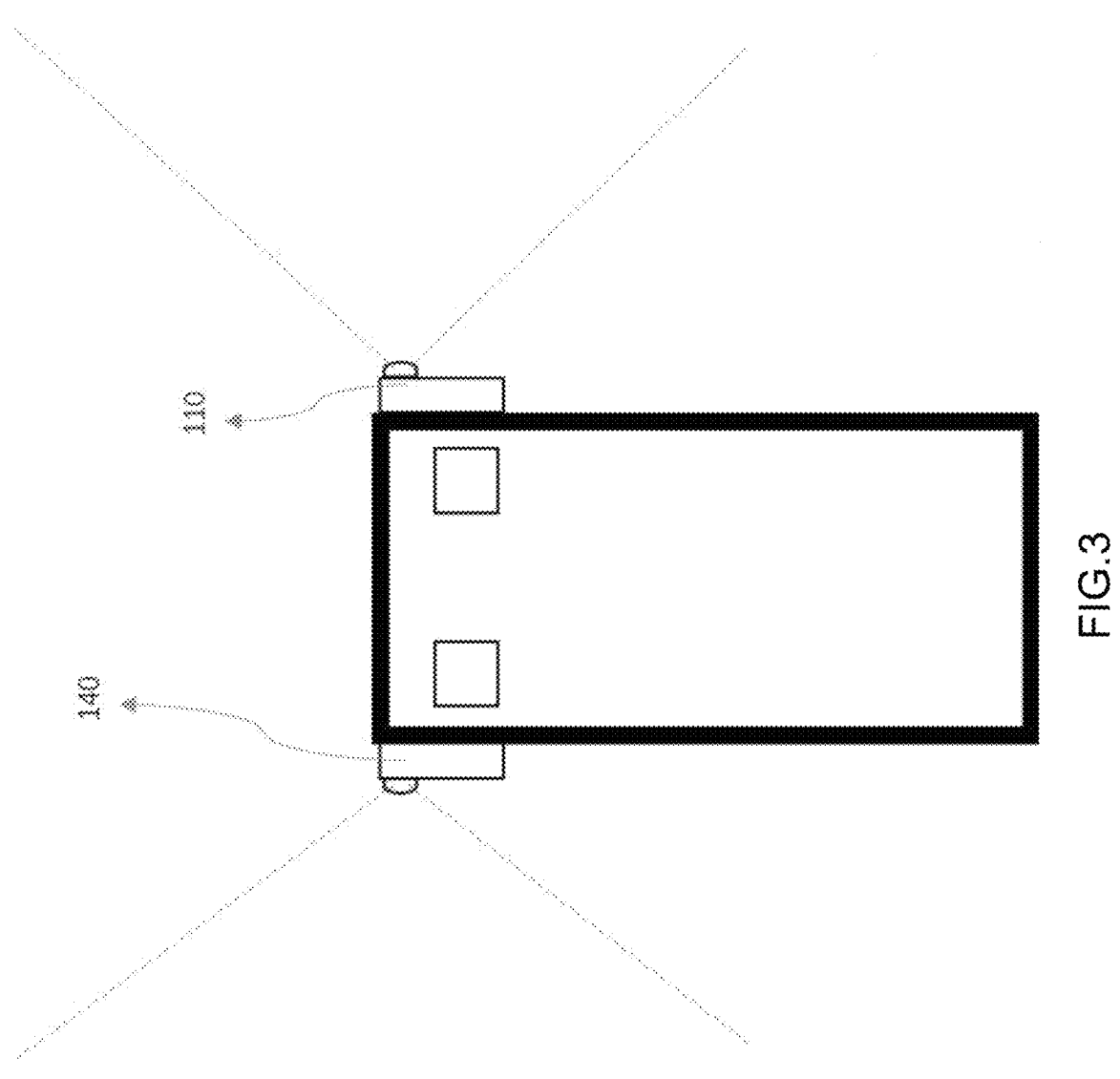
FIG. 3 is a monitoring state diagram of the device of the embodiment of the present application.

In FIG. 3, the left electronic rearview 140 rotates around its rotation axis, so that the left camera 141 can monitor the left space of the current vehicle 1; and the right electronic rearview 110 rotates around its rotation axis, so that the right camera 111 can monitor the right space of the current vehicle 1.

Figure 4:
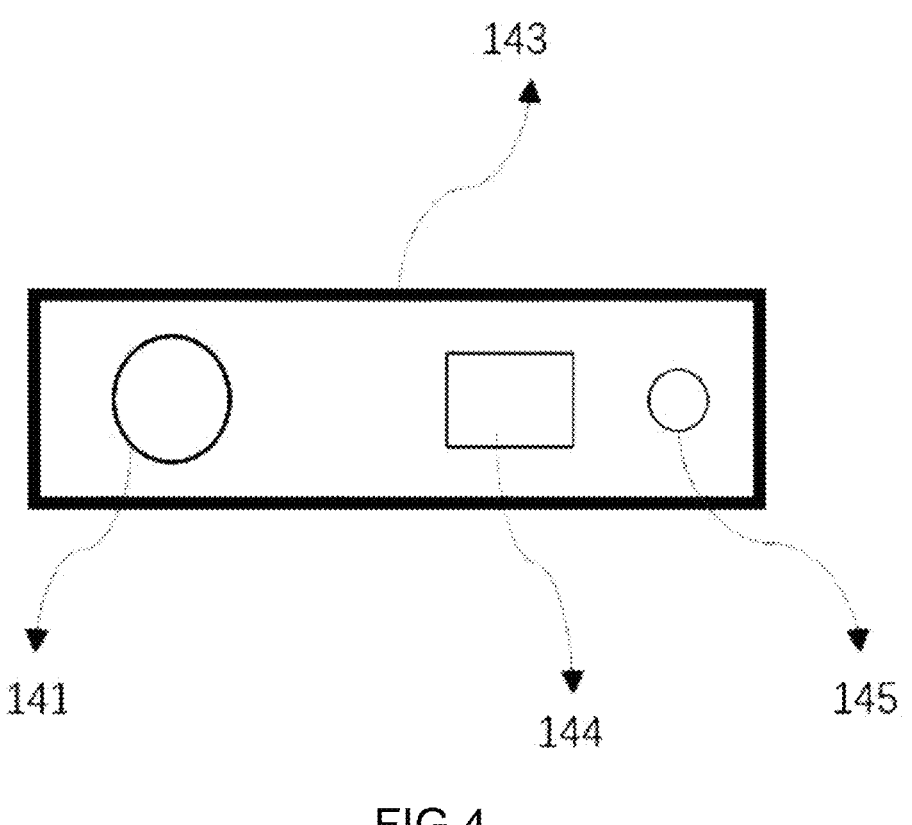
FIG. 4 is a structural schematic diagram of the device of the embodiment of the present application.

As shown in FIG. 4, besides the left camera 141, there are still a left loudspeaker 144, a left microphone 145 and a left electronic rearview 143 shell on the left electronic rearview mirror 140. The left camera 141, the left loudspeaker 144 and the left microphone 145 all are mounted on the left electronic rearview 143 shell. The structure of the right rearview mirror and the structure of the left rearview mirror are symmetric.

When the vehicle is in a monitored state shown in FIG. 3, the electronic rearview mirror monitors the trajectory state of the pedestrian around the vehicle. When the electronic rearview mirror judges that the pedestrian is the vehicle owner blocked, the electronic rearview mirror communicates with a mobile phone of the vehicle owner through a TBOX module and transfers the field of view of the electronic rearview mirror to the mobile phone of the vehicle owner. The vehicle owner decides whether the electronic rearview mirror of the vehicle is connected. If the vehicle owner decides to connect the electronic rearview mirror of the vehicle, the vehicle owner communicates and talks with the vehicle owner blocked through the loudspeaker and microphone on the electronic rearview mirror, and can further check the image in the field of view of the electronic rearview mirror in real time. The communication module can be the TBOX module. The device monitors the trajectory state of the pedestrian around the vehicle. When the device judges that the pedestrian is the vehicle owner blocked, the device communicates with the mobile phone of the vehicle owner through the TBOX module and transfers the field of view of the device to the mobile phone of the vehicle owner. The vehicle owner decides whether the electronic rearview mirror of the vehicle is connected. If the vehicle owner decides to connect the device of the vehicle, the vehicle owner communicates and talks with the vehicle owner blocked through the loudspeaker and microphone on the device, and can further check the image in the field of view of the electronic rearview mirror in real time. In the embodiment, a vehicle owner informing mode is initiatively judged by the electronic rearview mirror. The first level communication initiative is mastered on the electronic rearview mirror, so that the problem that the vehicle owner is harassed is avoided. After the electronic rearview mirror performs judgment, the vehicle owner can further judge whether other vehicles are blocked according to the image transferred back by the electronic rearview mirror, and the second level communication initiative is mastered by the vehicle owner. The double guarantees enhance the favorability of clients on the product. In terms of structure, no modules are additionally arranged in the aspect of hardware, and the electronic rearview mirror and the TBOX module on the current vehicle are borrowed. The function is implemented from the aspect of a software algorithm, so that the replicability is high. The communication mode is initiatively judged by the electronic rearview mirror of the vehicle. Different from the mode where other vehicles need to initiatively operate the vehicle, the damage to the vehicle caused by other vehicles is avoided. The communication mode is a frequently used communication mode of the TBOX and the mobile phone of the vehicle owner, so that the vehicle using cost of the vehicle owner is lowered.

Apparently, the abovementioned embodiments of the present application are merely examples made for describing the present application clearly and are not to limit the implementation modes of the present application. Those of ordinary skill in the art can further make modifications or variations in other forms on the basis of the above description. It is unnecessary to and unable to list all the implementation modes herein. Any modification, equivalent replacement, improvement, etc. made within the spirit and principle of the present application shall be regarded as within the scope of claims of the present application.

The invention claimed is:

1. A method for detecting a target pedestrian around a vehicle, applied to an automobile electronic product, wherein the method comprises the following steps:

monitoring a monitor area of a current vehicle in real time and acquiring a target trajectory;

judging whether there is the target pedestrian in the monitor area according to the target trajectory;

if a judged result is true, there being the target pedestrian in the monitor area; and otherwise, performing no processing;

the step of judging whether there is the target pedestrian in the monitor area according to the target trajectory comprises:

calculating a similarity between the target trajectory and a preset trajectory and acquiring a similarity value; and if the similarity value is less than a preset similarity value, judging that there is the target pedestrian in the monitor area of the current vehicle, and otherwise, performing no processing;

the similarity between the target trajectory and the preset trajectory is calculated by means of a Fréchet distance algorithm or a Hausdorff distance algorithm;

the target trajectory comprises a left trajectory collected by the left camera, and the preset trajectory comprises a first preset trajectory; and the step of calculating a similarity between the target trajectory and a preset trajectory and acquiring a similarity value comprises:

the left trajectory being AB, a continuous function of the left trajectory at a variable t being y(t), and representing a spatial position of the left trajectory as f(y(t);

the first preset trajectory being A'B', a continuous function of the first preset trajectory at a variable t being y'(t), and representing a spatial position of the first preset trajectory as f(x'(t)); and calculating a similarity between the left trajectory and the first preset trajectory by means of the Fréchet distance algorithm to acquire a first similarity value, with a formula as follows:

$$F(AB, A'B') = \min_{\substack{y[0,t_{max}]\to[0,M] \\ y'[0,t_{max}]\to[0,M']}} \left\{ \max_{t\in[0,t_{max}]} d(f(y(t)), f'(y'(t))) \right\}, \quad (1)$$

where M is a length of the left trajectory, M' is a length of the first preset trajectory, and d((f (y(t), f'(y'(t))) is a distance between f(y(t) and f'(y'(t)).

2. The method for detecting a target pedestrian around a vehicle according to claim 1, wherein the step of monitoring a monitor area of a current vehicle in real time and acquiring a target trajectory comprises:

monitoring the monitor area through a left camera/right camera arranged on the current vehicle to acquire image information of the monitor area in real time, and identifying an image signal to judge whether the image signal comprises characteristics of the target pedestrian;

if the image signal comprises the characteristics of the target pedestrian, acquiring the target trajectory according to continuous image signals; and otherwise, performing no processing.

3. The method for detecting a target pedestrian around a vehicle according to claim 1, wherein the target trajectory comprises a right trajectory collected by the right camera, and the preset trajectory comprises a second preset trajectory; and the step of calculating a similarity between the target trajectory and a preset trajectory and acquiring a similarity value comprises:

the right trajectory being CD, a continuous function of the right trajectory at a variable t being g(t), and representing a spatial position of the right trajectory as f(g(t));

the second preset trajectory being A'B'=N, a continuous function of the second preset trajectory at a variable t being g'(t), and representing a spatial position of the second preset trajectory as f(g'(t)); and calculating a similarity between the right trajectory and the second preset trajectory by means of the Fréchet distance algorithm to acquire a second similarity value, with a formula as follows:

$$F(CD, C'D') = \min_{\substack{g[0,t_{max}]\to[0,N] \\ g'[0,t_{max}]\to[0,N']}} \left\{ \max_{t\in[0,t_{max}]} d(f(g(t)), f'(g'(t))) \right\}, \quad (2)$$

where N is a length of the right trajectory, N' is a length of the second preset trajectory, and d((f(g(t)), f'(g'(t))) is a distance between f(g(t)) and f'(g'(t)).

4. The method for detecting a target pedestrian around a vehicle according to claim 3, wherein the step of judging whether there is the target pedestrian in the monitor area according to the target trajectory further comprises:

calculating an average velocity V of the left trajectory AB and the right trajectory CD, in $$V = \frac{V_{ab} + V_{cd}}{2}, \quad (3)$$

where $V_{ab}$ is average data of the left trajectory and $V_{cd}$ is an average velocity of the right trajectory; and letting a length from an end point B of the left trajectory to an end point D of the right trajectory to be L, and judging whether $$\frac{L}{V} \in [|T_b - T_d| - \Delta t, |T_b - T_d| + \Delta t] \quad (4)$$

is established, where $T_b$ is time when the pedestrian arrives at B, $T_d$ is time when the pedestrian arrives at D, and $\Delta t$ is preset time.

5. A method for moving a vehicle, wherein the method comprises the following steps:

judging whether there is a target pedestrian in a monitor area by means of the method for detecting a target pedestrian around a vehicle according to claim 1; and if there is the target pedestrian, sending a notification to a target terminal, and sending view images of a left camera and a right camera to the target terminal, and confirming, by the target terminal, whether a communication module of a current vehicle is connected for communication;

the step of judging whether there is the target pedestrian in the monitor area according to the target trajectory comprises:

calculating a similarity between the target trajectory and a preset trajectory and acquiring a similarity value; and if the similarity value is less than a preset similarity value, judging that there is the target pedestrian in the monitor area of the current vehicle, and otherwise, performing no processing:

the similarity between the target trajectory and the preset trajectory is calculated by means of a Fréchet distance algorithm or a Hausdorff distance algorithm;

the target trajectory comprises a left trajectory collected by the left camera, and the preset trajectory comprises a first preset trajectory; and the step of calculating a similarity between the target trajectory and a preset trajectory and acquiring a similarity value comprises:

the left trajectory being AB, a continuous function of the left trajectory at a variable t being y(t), and representing a spatial position of the left trajectory as f(y(t));

the first preset trajectory being A'B', a continuous function of the first preset trajectory at a variable t being y'(t), and representing a spatial position of the first preset trajectory as f(y'(t)); and calculating a similarity between the left trajectory and the first preset trajectory by means of the Fréchet distance algorithm to acquire a first similarity value, with a formula as follows:

$$F(AB, A'B') = \min_{\substack{y[0,t_{max}]\to[0,M] \\ y'[0,t_{max}]\to[0,M']}} \left\{ \max_{t\in[0,t_{max}]} d(f(y(t)), f'(y'(t))) \right\}, \quad (1)$$

where M is a length of the left trajectory, M' is a length of the first preset trajectory, and d((f(y(t), f'(y'(t))) is a distance between f(y(t)) and f'(y'(t));

wherein the target trajectory comprises a right trajectory collected by the right camera, and the preset trajectory comprises a second preset trajectory; and the step of calculating a similarity between the target trajectory and a preset trajectory and acquiring a similarity value comprises:

the right trajectory being CD, a continuous function of the right trajectory at a variable t being g(t), and representing a spatial position of the right trajectory as f(g(t));

the second preset trajectory being A'B'=N, a continuous function of the second preset trajectory at a variable t being g'(t), and representing a spatial position of the second preset trajectory as f(g'(t)); and calculating a similarity between the right trajectory and the second preset trajectory by means of the Fréchet distance algorithm to acquire a second similarity value, with a formula as follows:

$$F(CD, C'D') = \min_{\substack{g[0,t_{max}]\to[0,N] \\ g'[0,t_{max}]\to[0,N']}} \left\{ \max_{t\in[0,t_{max}]} d(f(g(t)), f'(g'(t))) \right\}, \quad (2)$$

where N is a length of the right trajectory, N' is a length of the second preset trajectory, and $d((f(g(t)), f'(g'(t)))$ is a distance between $f(g(t))$ and $f'(g'(t))$.

6. The method for moving a vehicle according to claim 5, wherein the step of monitoring a monitor area of a current vehicle in real time and acquiring a target trajectory comprises:

monitoring the monitor area through a left camera/right camera arranged on the current vehicle to acquire image information of the monitor area in real time, and identifying an image signal to judge whether the image signal comprises characteristics of the target pedestrian;

if the image signal comprises the characteristics of the target pedestrian, acquiring the target trajectory according to continuous image signals; and otherwise, performing no processing.

7. The method for moving a vehicle according to claim 5, wherein the step of judging whether there is the target pedestrian in the monitor area according to the target trajectory further comprises:

calculating an average velocity V of the left trajectory AB and the right trajectory CD, in $$V = \frac{V_{ab} + V_{cd}}{2}, \tag{3}$$

where $V_{ab}$ is average data of the left trajectory and $V_{cd}$ is an average velocity of the right trajectory; and letting a length from an end point B of the left trajectory to an end point D of the right trajectory to be L, and judging whether $$\frac{L}{V} \in [|T_b - T_d| - \Delta t, |T_b - T_d| + \Delta t] \tag{4}$$

is established, where $T_b$ is time when the pedestrian arrives at B, $T_d$ is time when the pedestrian arrives at D, and $\Delta t$ is preset time.

8. The method for moving a vehicle according to claim 7, wherein the step of judging whether there is the target pedestrian in the monitor area according to the target trajectory comprises:

when the first similarity value is less than a first preset similarity value of the preset similarity value, the second similarity value is less than a second preset similarity value of the preset similarity value, or the similarity values are less than any one or more of similarity values in formula (4), judging that there is the target pedestrian in the monitor area.

\* \* \* \* \*